United States Patent Office 3,144,152
Patented Aug. 11, 1964

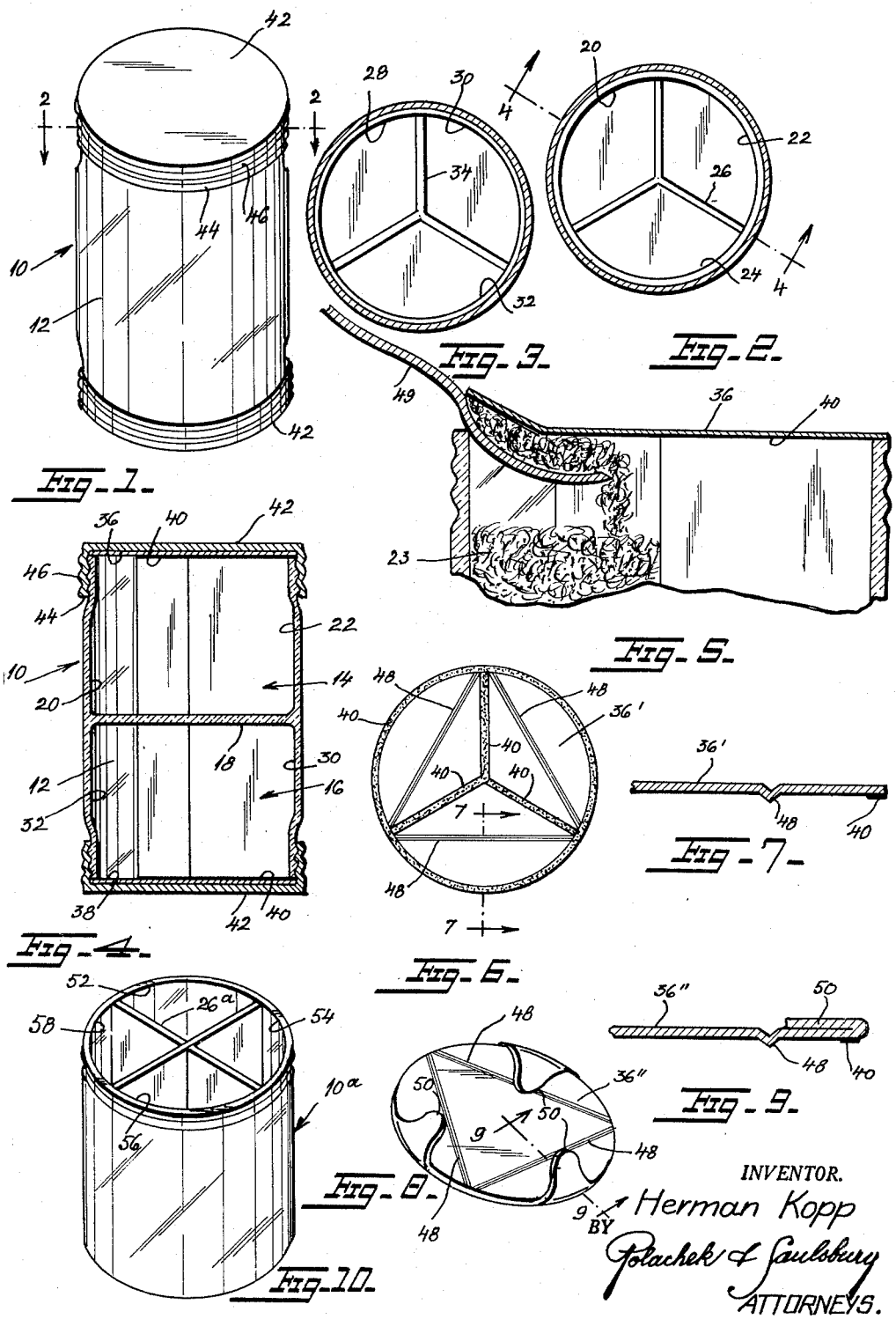

3,144,152
INDIVIDUAL DIVISIONAL JAR FOR COFFEE
AND OTHER FOOD PRODUCTS
Herman Kopp, 2910 Bruner Ave., New York 69, N.Y.
Filed Dec. 30, 1963, Ser. No. 334,119
1 Claim. (Cl. 215—6)

This invention relates to food containers and more particularly to new and useful improvements in an individual compartmented jar for coffee and similar food products.

The present invention is illustrated in conjunction with a glass container such as those normally employed for coffee. Generally such containers are not compartmented and when the cover is removed the entire contents of the container is exposed to the air causing the coffee to deteriorate. In accordance with the present invention, the glass container is divided into a plurality of compartments and each compartment is separately and individually sealed so that in order to preserve the aroma and freshness of the coffee one compartment at a time is opened and the remaining compartment kept hermetically sealed.

Therefore a primary object of the present invention is to provide a compartmented jar which may be constructed of glass and which may be employed for packaging coffee. The upper end of the jar is closed by a closure cap having a liner or seal on the inner surface thereof which closure cap forms a closure for the entire jar and also a closure for each compartment defined by the partitions.

The top openings of the compartments are closed by a closure disc seated on the top peripheral edge of the cylindrical jar and on the top edges of the partitions which with the jar body define the compartments. The disc is sealed to its seat. The upper end of the jar is closed by a closure cap, which cap, in addition to the disc, forms a closure for the entire jar and also a closure for each compartment defined by the partitions.

Another object of the invention is to provide a compartmented jar for coffee that is economical to manufacture, simple in construction, easily cleaned and attractive in appearance.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a top perspective view of a jar embodying my invention.

FIG. 2 is a cross-sectional view taken on the plane of the line 2—2 of FIG. 1.

FIG. 3 is a view similar to FIG. 2 showing the bottom of the jar.

FIG. 4 is a vertical sectional view taken on the line 4—4 of FIG. 2.

FIG. 5 is an enlarged vertical sectional view of the top of the jar showing coffee in one of the compartments and a spoon preparatory to leveling off the coffee.

FIG. 6 is a bottom plan view of a modified form of sealing disc.

FIG. 7 is an enlarged sectional view taken on the plane of the line 7—7 of FIG. 6.

FIG. 8 is a top perspective view of another modified form of sealing disc.

FIG. 9 is a sectional view taken on the line 9—9 of FIG. 8.

FIG. 10 is a top perspective view of a jar embodying a modified form of the invention, the cover cap being omitted.

Referring now in detail to the drawings, a jar embodying one form of the invention is shown in FIG. 1 and is designated generally by the reference numeral 10. The jar 10 is formed of glass but may be made of any other suitable material and is that type of jar normally employed for packaging coffee and similar granular foods. The jar includes a cylindrical peripheral wall 12 defining a cylindrical interior divided into two halves 14 and 16 by a transverse wall 18. Both ends of the jar are open. The half 14 is further divided into a plurality of compartments 20, 22 and 24 by radially extending partitions 26, all of which are integral with each other at the center thereof and integral with the peripheral wall at the outer ends thereof.

The half 16 is further divided into a plurality of compartments 28, 30, 32 by radially extending partitions 34, all of which are integral with each other at the center thereof and integral with the peripheral wall at the outer ends thereof. These compartments permit a variety in packing the contents. The jar may be formed in the usual manner of the formation of such jars such as by molding or the like.

In accordance with the invention, a circular sealing disc 36 closes the end openings of the compartments 20, 22 and 24 and a similar disc 38 closes the end openings of the compartments 28, 30 and 32. The discs are flexible, being formed of wax paper or the like, and seat on the outer peripheral end edge of the wall 12 and on the outer end edges of the partitions 26 and 34, with adhesive 40 between the seats and discs, whereby the compartments are hermetically sealed individually and the entire jar is sealed at both ends so that the contents stay fresh.

A sheet metal closure cap 42 closes each open end of the jar. The body of the cap has a depending peripheral flange 44 with screw threads 46 for coacting with threads on the adjacent end of the jar for securing the cap to the jar.

In use, by removing a cap and lifting a disc, a single compartment or portion thereof may be opened for removal of the contents 23 or for leveling off the contents by means of a spoon 49 as shown in FIG. 5.

In FIGS. 6 and 7, a modified form of sealing disc 36' for use with either end of the jar 10 is shown. The disc 36' differs from the disc 36 in that the material of the disc is formed with crimped chords 48 extending thereacross from various points along the periphery thereof, which chords are adapted to overlie the individual compartments in the jar. The chords do not intersect the periphery. The chords can be grasped by the fingers of the user and facilitate lifting of the disc off of its seat to open a compartment or portion thereof.

The material of the disc 36' is coated with adhesive along the lines 49 radiating from the center in simulation of the edges of the partitions 26 and 34 so as to effectively seal the disc to the partitions.

Another modified form of sealing disc 36" is shown in FIGS. 8 and 9. Disc 36" differs from disc 36 in that spaced integral peripheral lugs 50 are formed on the disc 36" which lugs are pressed flatwise down on the body of the disc. The lugs serve as finger pieces for lifting the disc or a portion thereof off of its seat.

A modified form of jar 10ª is shown in FIG. 10, differing from the jar 10 only in that the interior of the body is divided into four compartments 52, 54, 56, 58 extending the entire length of the body of the jar by means of the partitions 26ª.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A compartmented jar comprising a hollow cylindrical body open at both ends and exteriorly threaded on both ends, a transverse wall partition dividing the interior of the body into two halves, a plurality of partitions in each half dividing the interior of the half into a plurality of compartments, the outer edges of the rims of the body and the outer edges of the partitions forming continuous surface areas, a detachable sealing disc seated on said surface areas at each end sealing off the compartments, reverted integral lugs on said disc overlying each compartment, score lines on each disc adjacent each lug whereby a portion of the disc may be lifted to expose an individual compartment, and an internally threaded cap overlying each disc and its associated lugs and engaged with the adjacent external threads of the body.

References Cited in the file of this patent

UNITED STATES PATENTS

| | | |
|---|---|---|
| 2,611,499 | Mayer | Sept. 23, 1952 |
| 2,689,664 | Vingron | Sept. 24, 1954 |
| 3,052,368 | Atkins et al. | Sept. 4, 1962 |